UNITED STATES PATENT OFFICE.

LEO GANS, OF FRANKFORT-ON-THE-MAIN, AND MEINHARD HOFFMANN, OF MAINKUR, NEAR FRANKFORT-ON-THE-MAIN, ASSIGNORS TO LEOPOLD CASSELLA & CO., OF FRANKFORT-ON-THE-MAIN, GERMANY.

BLACK DYE.

SPECIFICATION forming part of Letters Patent No. 501,500, dated July 18, 1893.

Application filed January 6, 1893. Serial No. 457,523. (Specimens.) Patented in France January 22, 1891, No. 201,770, and in England January 30, 1891, No. 1,742.

*To all whom it may concern:*

Be it known that we, LEO GANS, a resident of Frankfort-on-the-Main, and MEINHARD HOFFMANN, a resident of Mainkur, near Frankfort-on-the-Main, Germany, subjects of the King of Prussia, have invented new and useful Improvements in the Production of Black Coloring-Matters, of which the following is a specification.

This invention relates to an improvement in the manufacture of black and blue dyestuffs, for which patents have been obtained in France, dated January 22, 1891, as certificat d'addition au brevet, No. 201,770, and in Great Britain, No. 1,742, dated January 30, 1891. United States Patent No. 442,369 contains a general description of this invention, describing the production of mixed disazo dyestuffs deriving from one molecule of a tetrazo compound, one molecule of gamma-amidonaphtholsulfo acid and one molecule of another phenol or amine. We have found that among these phenols or amines the amidonaphtholdisulfo acid H, first described in the United States Patent No. 464,135, gives specially valuable results. The mixed dyestuff for instance from benzidine, gamma-amidonaphtholsulfo acid and acid H dyes unmordanted cotton deep and fast blue black shades. It is of no importance in which order the two acids are combined with the tetrazo body.

In carrying out this invention we proceed for instance as follows: 18.4 kilograms benzidine are diazotized. The well cooled solution is made alkaline by means of carbonate of soda and thirty-six kilograms of the sodium salt of the amidonaphtholdisulfo acid H are slowly added. Immediately afterward a solution of the sodium salt of twenty-five kilograms gamma-amidonaphtholsulfo acid is poured into the solution of the intermediate compound. After a lapse of some hours the formation of the color is completed. It is heated to the boil and the color is precipitated by means of common salt. In this example the benzidine may be replaced by other paradiamines, such as tolidine, methylbenzidine, paraphenylenediamine, diamidoethoxydiphenyl, diamidodiphenolether, diamidoazobenzene, &c. All these dyestuffs produce black to blue shades on unmordanted cotton. The colors can be diazotized and secondary derivatives of the same can be produced in substance or on the fiber.

Having now described the nature of the said invention and in what manner the same may be performed, what we claim is—

The bluish black coloring matters herein described derived from tetrazo compounds of paradiamines such as benzidine or analogous bodies, one molecule of gamma-amidonaphtholsulfo acid and one molecule of amidonaphtholdisulfo acid H which is easily soluble in water with a bluish black color, insoluble in spirit, dissolving in strong sulfuric acid with a blue color, being transformed by nitrous acid into a tetrazotized dye-stuff which can be combined with phenols or amines.

In testimony that we claim the foregoing as our invention we have signed our names, in presence of two witnesses, this 21st day of December, 1892.

LEO GANS.
MEINHARD HOFFMANN.

Witnesses:
OTTO QUECK,
JACOB WERNER.